April 13, 1954 — E. TEGNER — 2,674,828
SOILLESS GROWING OF PLANTS
Filed Sept. 8, 1949 — 3 Sheets-Sheet 1
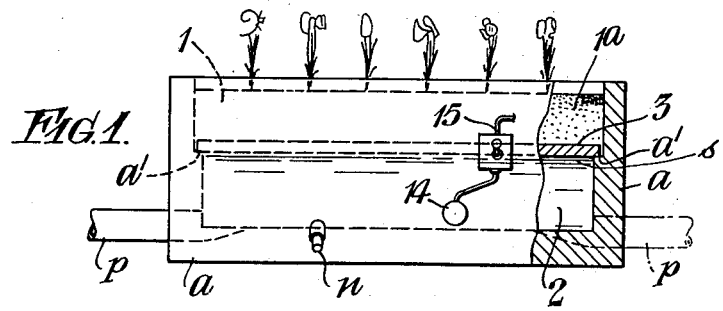
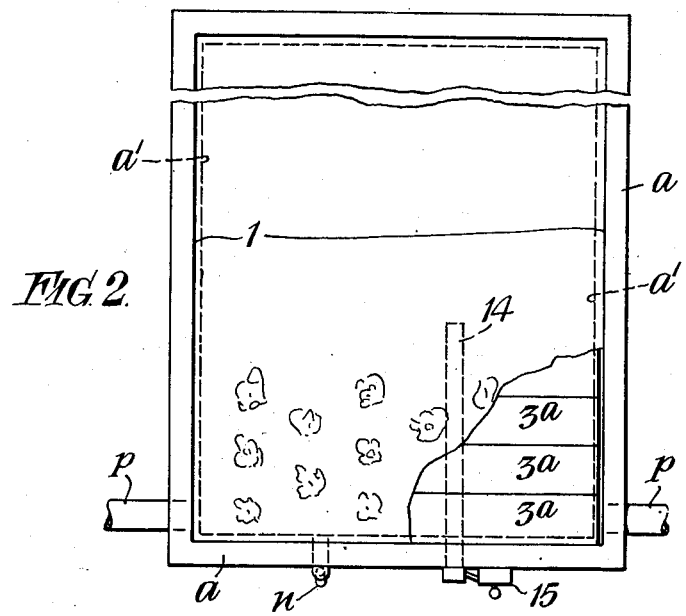
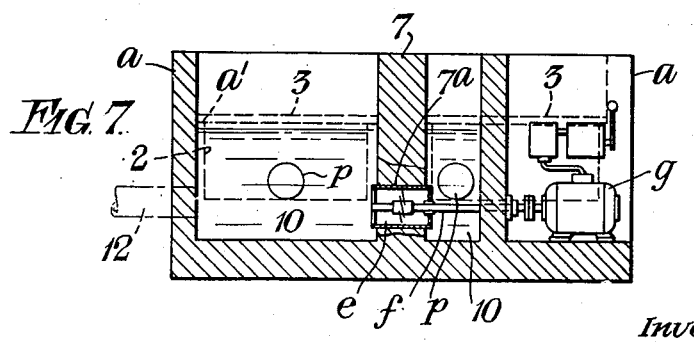
Inventor
ERIK TEGNER
per R. V. Bowden
Attorney.

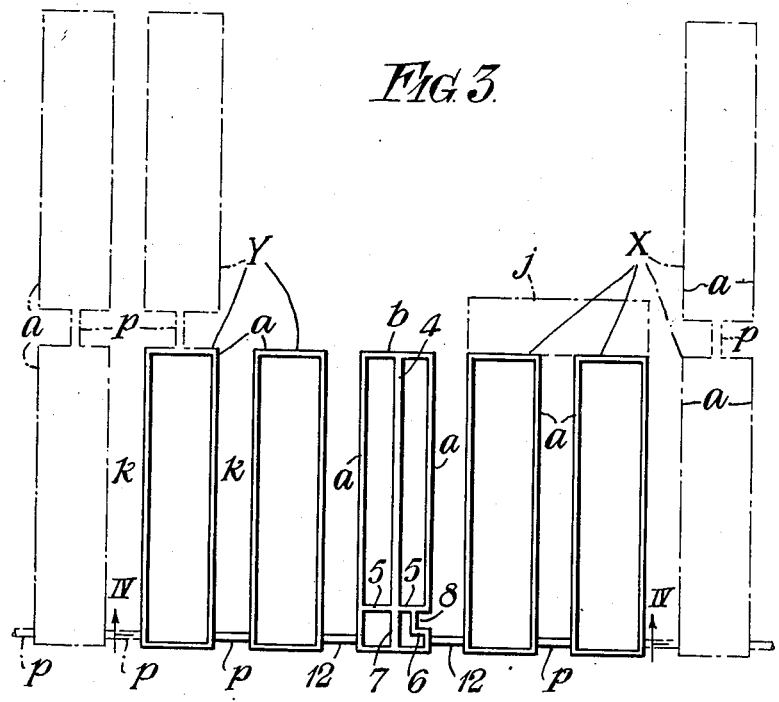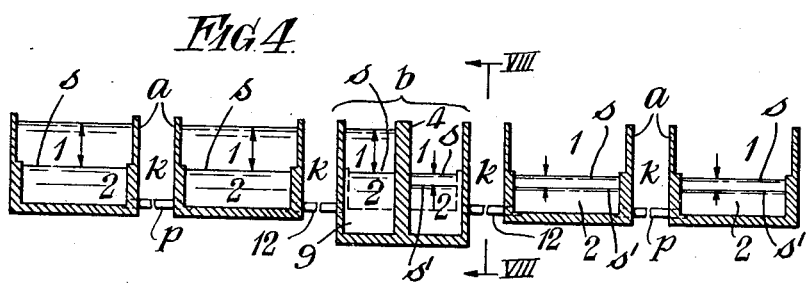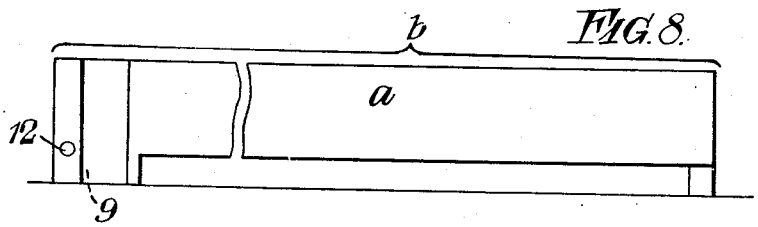

April 13, 1954     E. TEGNER     2,674,828
SOILLESS GROWING OF PLANTS
Filed Sept. 8, 1949     3 Sheets-Sheet 3
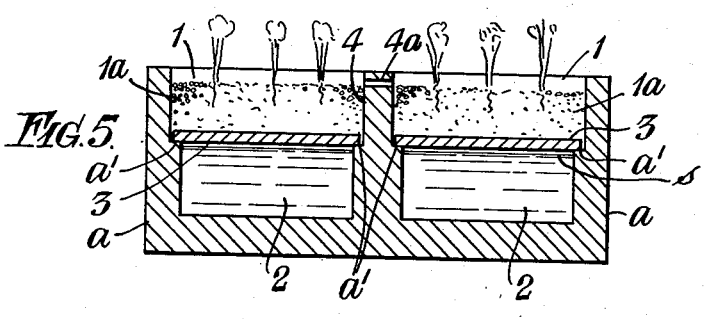
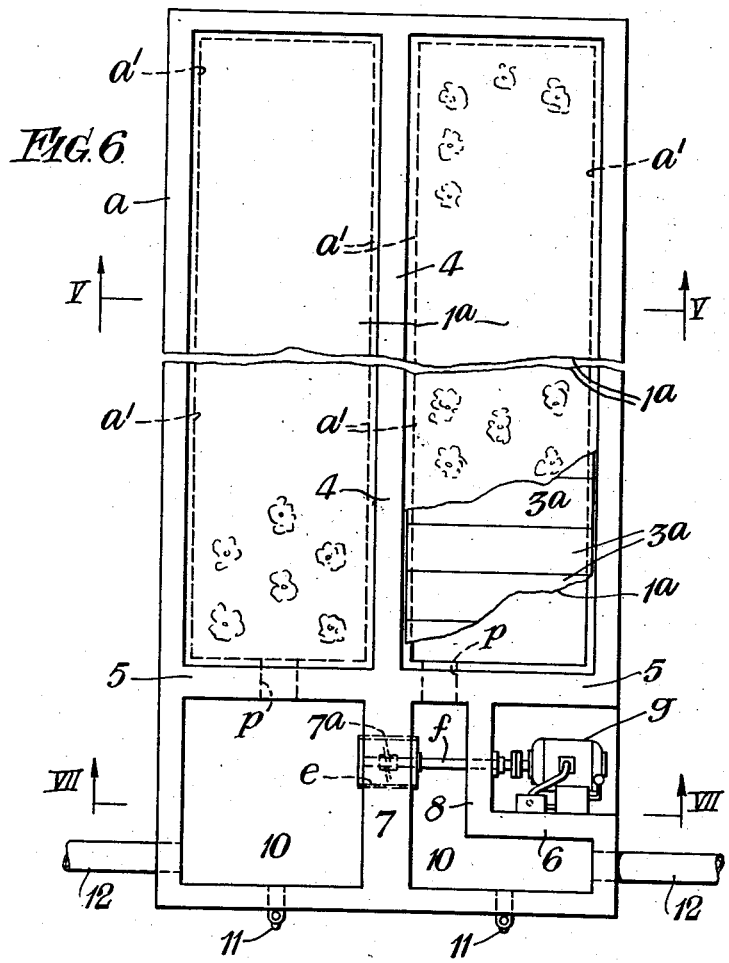
Inventor
ERIK TEGNER
per R. Bowden
Attorney Patented Apr. 13, 1954

2,674,828

UNITED STATES PATENT OFFICE 2,674,828

SOILLESS GROWING OF PLANTS

Erik Tegner, Reading, England

Application September 8, 1949, Serial No. 114,561

6 Claims. (Cl. 47—1.2)

This invention relates to the growing of plants without soil, known under various names such as hydroponics, tank farming, sub-irrigation, nutrient solution culture and so forth.

In known systems of soilless cultivation of plants growing beds are arranged in watertight benches and partially filled with gravel, cinders or similar rubbly material and provided with lanes to facilitate access to the beds which are connected by pipes to a storage tank for a nutrient chemical solution which is pumped through pipes to the growing beds from which it flows back to the storage tank on cessation of the pumping operation.

The object of the present invention is to provide a new and improved hydroponic method, layout and means which is relatively economical to install and adapted to be maintained and operated with a minimum of expense and labour and when a greenhouse or other structure is employed enables a mild and efficient heating thereof to be effected, and in any case ensures the maintenance of the roots of the plants and their growing beds at a safe temperature, and also greatly facilitates rapid and efficient flushing of the gravel or other growing medium employed in the growing beds and likewise enables a high ratio to be maintained between the volume of solution and number of the growing plants so as to reduce the frequency of the necessary periodic analyses to test the strength etc. of the nutrient solution; while the improved construction and layout of the growing beds enable separate storage tanks for the nutrient solution to be dispensed with and also the consequential installation of a system of feeding pipes between the same and the growing beds.

According to the present invention growing beds for effecting the soilless growing of plants comprise upper and lower stations separated by a pervious intermediate flooring or horizontal partition, the upper section forming the growing bed which is provided as usual with gravel, cinders or other suitable rubbly material, adapted to serve as the growing medium or anchorage for the roots of the plants, while the lower section serves as a reservoir for the nutrient solution employed for feeding the plants.

The growing beds are conveniently arranged in groups or batteries in which the reservoirs of such grouped beds are connected with each other so that a group or battery can be connected with one side of a pumping station or its equivalent and a second group or battery of similar growing beds in which the reservoirs are also interconnected with each other is connected to the other side of the pumping station, or its equivalent.

The above described arrangement and layout of the improved growing beds and reservoirs in combination with a pumping station or its equivalent, enables the nutrient solution in the reservoirs of one group or battery of the improved growing beds to be withdrawn and forced via the pumping station into the reservoirs of the similar group connected to the other side of the pumping station or its equivalent, and as this transfer takes place the liquid forced through the delivery side of the pump causes the level of the nutrient solution to rise through the pervious flooring of the corresponding growing beds so sub-irrigating the plants therein. As the rising nutrient solution reaches its pre-determined level the pumping mechanism or its equivalent is stopped, either automatically or by hand, and restarted in reverse so as to return the excess nutrient solution via the pumping station or its equivalent into the reservoirs of the growing beds from which such nutrient solution was withdrawn. As the pumping continues the nutrient solution from the reservoirs of the growing beds that were on the delivery side of the pump are by the reversal of its action now on the suction side of the pump or its equivalent, so that the remaining nutrient solution is in turn transferred via the pump or its equivalent to the reservoirs of the first mentioned group of growing beds until the rising nutrient solution reaches its pre-determined level in the first mentioned group of growing beds. The pumping mechanism or its equivalent is then again stopped and may be reversed to repeat the operation if desired, or the pump or its equivalent left inoperative which enables the excess nutrient solution on one side of the pumping station to flow back under the influence of gravity into the partially empty reservoirs connected on the other side of the pumping station or its equivalent until the level of the nutrient solution in the reservoirs of both groups finds its normal level relatively to the undersides of the respective growing beds.

The combined growing beds and storage tanks may be constructed of concrete, steel plates or other suitable material and the interior thereof coated with bituminous paint and the like in known manner, and may be made in various dimensions according to requirements.

In one convenient manner of carrying out the invention the trough-like structures forming the combined growing beds and reservoirs are provided with internal longitudinal ledges on each side thereof which are of sufficient depth to form the supports for transverse flooring members, the ledges may have rough or slightly recessed surfaces, while the flooring members may consist of slabs of plain or reinforced glass, thin cement slabs, or metal plates and sheets or other suitable material and which are formed so that when assembled, openings are formed at their joints with each other to render the flooring sufficiently pervious for the nutrient solution to pass to and from the growing bed and the reservoir as such solution is displaced and returned by a pump or its equivalent.

With regard to the arrangement and layout of the improved combined growing beds and reservoirs in combination with a pump or its equivalent for transferring the nutrient solution from one interconnected group to another interconnected group in circuit with the same pump, a pumping station may be arranged in one of the improved combined growing beds and reservoirs which is conveniently arranged between two interconnected batteries of such growing beds and reservoirs. For this purpose, the central bed is longitudinally sub-divided by a wall to form two adjacent combined growing beds and reservoirs and also sub-divided at one end by a transverse wall so as to form a housing for a reversible, rotary or other suitable pump and an electric or other suitable motor for driving same.

The motor is housed watertight in a compartment formed by transverse and longitudinal walls, which compartment may be provided with external doors for giving access thereto, while the rotary pump is operatively connected in known manner by shafting to the motor and is housed together with suitable bearings in a transverse tunnel through the longitudinal wall. The tunnel connects sump chambers arranged on opposite sides of such wall and said sump chambers in turn are respectively connected with the reservoirs of the batteries of combined growing beds and reservoirs.

If desired, provision may be made for maintaining the nutrient solution in the reservoirs of the respective growing beds at any required temperature for preventing damage to plants contained in the respective growing beds, such for instance as ordinary tubular electric heaters conveniently arranged in the interior of the respective reservoirs and connected through suitable switches to a source of electric current.

The invention is further described in reference to the accompanying diagrammatic drawings.

Fig. 1 is an end view partly in section, and Fig. 2 a fragmental plan view of Fig. 1 illustrating one construction of a combined growing bed and reservoir in accordance with the present invention.

Figs. 3 and 4 are diagrammatic views on smaller scales illustrating a layout and arrangement of the combined growing beds and reservoirs with a pumping station arranged in a centrally disposed combined growing bed and reservoir. Fig. 3 is a diagrammatic plan view, and Fig. 4 a diagrammatic sectional view on a slightly larger scale taken on the line IV—IV Fig. 3.

Fig. 5 is a transverse sectional elevation taken on the line V—V of Fig. 6, Fig. 6 being a fragmental plan view, drawn on a larger scale illustrating the modified construction and arrangement of the centre bed indicated in Figs. 3 and 4 so as to adapt the same as a pumping station, to the opposite sides of which the reservoirs of a separate group or battery of combined growing beds and reservoirs of about the same volumetric capacity are connected for the purpose of sub-irrigating the growing beds by transferring the nutrient solution from the reservoirs on one side of the centre bed to those on the other side thereof and vice versa.

Fig. 7 is a transverse sectional elevation on the line VII—VII Fig. 6, further illustrating the arrangement and housing of the reversible rotary pump and its motor indicated in Fig. 6, while Fig. 8 is a detail external view taken on the line VIII—VIII Fig. 4 further illustrating the construction of the front end of the centre bed shown in Figs. 3, 4, 6 and 7.

The construction illustrated in the drawings of the combined growing beds and reservoirs comprises a rectangular trough-like structure $a$ formed of concrete which is sub-divided internally into upper and lower sections 1 and 2 by an intermediate flooring or horizontal partition 3, the flooring shown being conveniently formed by transverse flooring members $3^a$ of glass, cement, metal or other suitable materials adapted to be assembled so as to form openings in and about the joints between such floor members and their supports so as to allow the passage of the nutrient solution or other liquids through the flooring to the corresponding growing bed and vice versa.

As shown the transverse flooring members $3^a$ are supported upon internal ledges $a^1$ formed on the opposite longitudinal sides of the trough-like structure $a$, at the junctions between the relatively thick lower sections and the relatively thin upper sections of the longitudinal walls of the trough-like structure $a$ as shown in Figs. 1 and 5.

The flooring 3 of the growing bed formed by the upper section 1 of the trough-like structure $a$ is adapted to carry gravel, cinders or other rubbly material suitable to form the growing medium or anchorage for the roots of the growing plants, such growing material being indicated at $1^a$ and occupying about two thirds of the internal capacity or volume of the growing bed in which it is placed.

Such combined growing beds and reservoirs are conveniently arranged in interconnected groups or batteries in combination with a reversible pump or its equivalent as shown for example in Figs. 3 and 4 of the drawings, so that the nutrient solution from the reservoirs of one group as X can be transferred to the reservoirs of the other similar group Y, that is also connected to the same pump in order to alternately sub-irrigate the plants in the corresponding growing beds of the several reservoirs in each group.

As shown in the drawings the construction of one of the combined growing beds and reservoirs designated $b$ is modified to house a pump and its driving motor and provided with the requisite connections for connecting the respective groups X and Y to opposite sides of the pumping station so formed. For this purpose the modified central bed $b$ is longitudinally sub-divided by a longitudinal wall 4 to form two adjacent combined growing beds and reservoirs of similar capacity, as shown in Figs. 3, 4, 5 and 6, while the forward end of such central combined growing beds and reservoirs are transversely sub-divided by transverse walls 5 and 6 and short longitudinal walls 7 and 8, while the forward end of such central bed $b$ is made deeper than the rest of the structure $a$ forming the sub-divided growing beds and reservoirs comprised therein, as indicated at 9 so as to form sumps 10 on each side of the short longitudinal wall 7 through which latter is formed a transverse tunnel $7^a$ that houses a reversible pump e and its bearings, which pump is connected in known manner by a driving shaft f with an electric or other suitable motor g housed watertight in a recess formed within the forward end of the central bed b between the short internal transverse walls 5 and 6 and the small longitudinal wall 8 as indicated in Figs. 6 and 7.

The sumps are provided with low level outlets 11 so as to enable the nutrient solution to be withdrawn from the reservoirs of the batteries X and Y of the growing beds respectively connected with the central bed b by pipes 12.

As indicated in Figs. 1 and 2 the reservoirs 2 of the respective growing beds 1 may be furnished with means such as tubular electric heaters 14 conveniently arranged within the reservoirs and connected through suitable switches 15 to a suitable source of electric current.

When the reservoirs 2 in the groups X and Y are charged with nutrient solution its level in each of such reservoirs is just below the underface of the flooring 3 of the upper growing bed 1 as indicated by s in Fig. 1 and on the left of Fig. 4. After the pump or its equivalent has been operated to transfer nutrient solution from the reservoirs of one group as X of the growing beds into those of the other group Y, the amount of solution transferred is about one third of that contained in each of the reservoirs, as indicated on the right of Fig. 4 by the relative high and low level lines s and $s^1$, because about two thirds of the internal capacity of each growing bed is occupied by the gravel or other rubbly growing medium $1^a$ through which the solution rises to sub-irrigate the growing plants as such solution is transferred by the pump into the growing beds.

The combined growing beds and reservoirs may be made in various shapes and be connected in various ways. Thus as indicated in broken lines on the right of Fig. 3, two adjacent troughs a each comprising upper and lower sections as above described, may be connected by cross trough j of concrete or other suitable material, formed with or secured to the open ends of the two adjacent troughs, instead of being connected by pipes such as p arranged between such troughs. Fig. 3 also indicates in broken lines, and by way of example, how the number of combined growing beds and reservoirs included in a battery or group may be readily increased and functionally connected with the rest of the group or battery by the pipes p, so that such additional beds may be readily disconnected and removed if desired to other sites.

Also as shown in Fig. 3 the various troughs comprising the combined growing beds and reservoirs are separated by lanes k to facilitate ready access to the growing beds in known manner, while the pipes p by which the reservoirs comprised in the trough-like structure a are interconnected may be sunk level into the ground or be otherwise protected, while the reservoir of each of the combined growing beds and reservoirs is provided with an outlet as n Figs. 1 and 2 for enabling the nutrient solution in each reservoir to be drawn off as desired and also to enable each reservoir and its growing bed to be separately flushed according to requirements, in addition to the flushing of the batteries connected with the central bed b that may be effected through the low-level sumps 10 at the forward end of such bed through the low-level outlets 11.

To prevent waste of the nutrient solution in the event of over-running or inadvertent non-stopping of the pump by which the circulation of the nutrient solution is controlled, transverse over-flow channels $4^a$ are arranged through the upper part of the longitudinal dividing wall 4 in the modified central bed b as shown in Fig. 5 of the drawings, so that any over-flowing solution runs into the growing bed and reservoir on the low level side of the centre bed b from which latter the solution returns to the reservoirs of the respective growing beds comprised in the group.

Where the combined growing beds and reservoirs are installed in greenhouses or similar structures they serve to maintain the internal temperature thereof for considerable periods so preventing sudden falls of temperature because of the wide dispersion of the nutrient solutions in the various reservoirs, while these can be readily and economically maintained at any desired temperature to safeguard the plants and roots thereof with very little labour and expense.

I claim:

1. A soilless plant cultivation installation comprising two groups of growing beds, each bed comprising a pervious supporting structure, rubbly material located on said structure and a reservoir beneath said structure, a connection for the passage of nutrient solution from the beds of one said group to the beds of the other said group, and vice versa, a reversible pump in said connection and means for reversing the direction of said pump, whereby said solution may be pumped from the beds of one said group to aerate plants in that group and to flood the beds of the other said group and vice versa at periodic intervals.

2. A soilless plant cultivation installation comprising two groups of growing beds, said beds being located at substantially the same horizontal level and each said bed comprising a pervious supporting structure, rubbly material located on said structure and a reservoir beneath said structure, a connection for the passage of nutrient solution from the beds of one said group to the beds of the other said group, a reversible pump in said connection and means for reversing the direction of said pump, whereby said solution may be pumped from the beds of one said group to aerate plants in said group and to flood the beds of the other said group and vice versa at periodic intervals.

3. A plant cultivation installation comprising a first and a second group of growing beds, a further growing bed, each said bed comprising a pervious supporting structure, rubbly material located on said structure and a reservoir beneath said structure; means dividing one of said beds into two separate compartments, a first liquid conduit connecting the reservoirs of all the beds of said first group with one of said compartments, and a second liquid conduit connecting the reservoirs of said second group to the other of said compartments, a connecting passage between said compartments and reversible pump means operatively arranged in said passage for pumping nutrient liquid from the beds of one said group and the compartment connected therewith to the beds of the other said group and the compartment connected therewith, and vice versa, at periodic intervals.

4. A soilless plant cultivation installation comprising a first and a second group of growing beds, a further growing bed, all said beds being at substantially the same horizontal level and each said bed comprising a pervious supporting structure, rubbly material located on said structure and a reservoir beneath said structure; means dividing one of said beds into two compartments; a first liquid conduit connecting the reservoirs of all the beds of said first group with one of said compartments, a second liquid conduit connecting the reservoirs of all the beds of said second group with the other of said compartments, a connecting passage between said compartments and a reversible pump operatively arranged in said passage for pumping nutrient liquid from the beds of one said group and the compartment connected therewith to the beds of the other said group and the compartment connected therewith, and vice versa, at periodic intervals.

5. A soilless plant cultivation installation comprising a first and a second group of growing beds, a further growing bed, all said beds being at substantially the same horizontal level and each said bed comprising a pervious supporting structure, rubbly material located on said structure and a reservoir beneath said structure; partitions dividing said further growing bed into three separate compartments, the first and second of which being connected separately to the third, a first liquid conduit connecting the reservoirs of all the beds of said first group with said first compartment, a second liquid conduit connecting the reservoirs of all the beds of said second group with said second compartment, and reversible pump means located in said third compartment for pumping nutrient solution from the beds of said first group and said first compartment to the beds of said second group and said second compartment and vice versa at periodic intervals.

6. A soilless plant cultivation installation comprising a first and a second group of growing beds, a further growing bed, all said beds being at substantially the same horizontal level and each said bed comprising a pervious supporting structure, rubbly material located on said structure and a reservoir beneath said structure; partitions dividing said further growing bed into four separate compartments, the first and second of which are connected separately to the third, and the fourth of which is liquid free, a first liquid conduit connecting the reservoirs of all the beds of said first group with said first compartment, a second liquid conduit connecting the reservoirs of all the beds of said second group with said second compartment, a reversible motor located in said fourth compartment, and a pump driven by said motor and located in said third compartment for pumping nutrient solution from the beds of said first group and said first compartment through said third compartment to the beds of said second group and said second compartment.

References Cited in the file of this patent

UNITED STATES PATENTS

| Number | Name | Date |
|---|---|---|
| 2,060,735 | Krueger | Nov. 10, 1936 |
| 2,062,755 | Lyons et al. | Dec. 1, 1936 |

OTHER REFERENCES

Ellis et al., "Soilless Growth of Plants," Second Ed., 1947, pp. 100, 101.